United States Patent [19]
Neubert et al.

[11] Patent Number: 5,473,820
[45] Date of Patent: Dec. 12, 1995

[54] POWER-OPERATED SWORD SAW

[75] Inventors: Werner Neubert; Joachim Schadow; Joachim Mueller, all of Stuttgart; Manfred-Otto Staebler, Waldenbuch; Manfred Dohr, Esslingen; Heinz Warkentin, Allmersbach im Tal, all of Germany

[73] Assignee: Robert Bosch GmbH, Stuttgart, Germany

[21] Appl. No.: 207,852

[22] Filed: Mar. 7, 1994

[30]     Foreign Application Priority Data

Mar. 5, 1993 [DE] Germany .................. 43 06 974.6

[51] Int. Cl.⁶ ............................................. B27B 19/00
[52] U.S. Cl. ........................... 30/386; 30/369; 83/699.21
[58] Field of Search .......................... 30/369, 383, 386, 30/392, 501, 502; 83/746, 751, 821, 699.21, 698.71

[56]          References Cited

U.S. PATENT DOCUMENTS 4,026,020  5/1977  Hoppner et al. ....................... 30/386
4,856,195  8/1989  Grossmann et al. ................... 30/383
4,979,305  12/1990 Leini .................................. 30/369
4,999,918  3/1991  Schliemann et al. .................. 30/386
5,249,362  10/1993 Harding .............................. 30/383

FOREIGN PATENT DOCUMENTS 0267312  5/1988  European Pat. Off. .

*Primary Examiner*—Hwei Siu Payer
*Attorney, Agent, or Firm*—Michael J. Striker

[57]            ABSTRACT

A power-operated sword saw comprises a plate-shaped sword having a lower region with a guiding groove, two saw blades reciprocatingly movable in opposite directions parallel to one another and each having a front saw blade tip and an opposite clamping end. The saw blades have a toothed side provided with a plurality of teeth and an opposite saw blade back guided in the guiding groove of the sword. A drive is coupled with the clamping ends of the saw blades through a clamping unit. The saw blades are jointly coupled with the clamping unit and released from the clamping unit by a blocking element which blocks the clamping ends in a coupling position and release the clamping ends in a contact-free manner.

21 Claims, 4 Drawing Sheets

POWER-OPERATED SWORD SAW

BACKGROUND OF THE INVENTION

The present invention relates to a power-operated sword saw.

More particularly, it relates to a power-operated sword saw with two parallel and reciprocating saw blades having front saw blade tips and opposite clamping ends coupled by clamping means to a drive and provided at one side with saw teeth and at an opposite rear side guided in a guiding groove of a plate-shaped sword.

Sword saws of the above mentioned general type are known in the art. One of such sword saws is disclosed for example in the European patent document EP 267 312. At the clamping ends the saw blades of this sword saw are provided with a throughgoing opening. This opening is associated with a threaded opening of a driving base body mounted at the drive sight. The clamping end is held between the base body and a pressing member and tightened by a screw extending through these parts. In the above described construction a saw blade exchange is possible only by releasing the screw with an auxiliary tool, for example a screw driver or an inner hexagon tool. This is very inconvenient since through a lateral open housing slot the substantially different positions of the screw must be found by the auxiliary tool with relatively great time to be spent. Dust and chips can penetrate through the housing slot for mounting the saw blades and affect the operation of the saw. Each saw blade must be individually removed and mounted from the respective side of the saw housing.

The screws and the pressing member clamp the clamping end so that it rotates together with the drive. Therefore, undesired torques can be transmitted through the screws to the saw blades and reduce the efficiency of the force transmission. Due to mounting errors or due to vibrations during the operation of the saw, the screws and the pressing member can be loosened, released and lost. If the clamping ends of the saw blades are loosened during the operation of the sword saw, there is a substantial danger of injuries for the operator or the danger of damages to the saw and the workpiece, since no securing means are provided from a loosening or uncontrolled movements of the saw blades.

SUMMARY OF THE INVENTION

Accordingly, it is an object of the present invention to provide a sword saw, which avoids the disadvantages of the prior art.

In keeping with these objects and with others which will become apparent hereinafter, one feature of the present invention resides, briefly stated, in a power-operated sword saw in which the saw blades can be jointly coupled with the clamping means or released from the clamping means without an auxiliary tool, in that outside the clamping means or outside the saw blades, blocking means are provided which block the clamping ends in the coupled position or release the clamping ends in a contactless manner.

When the sword saw is designed in accordance with the present invention, it avoids the disadvantages of the prior art. In particular, the saw blades can be mounted and dismounted without an auxiliary tool by means of a single pressure key conveniently and fast and also without danger of injuries.

Moreover, the articulated clamping of the clamping ends is advantageous since the saw blade is reciprocable without tensioning in the sword and the clamping device is composed of a small number of the individual parts and therefore can be serviced easier and simpler.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
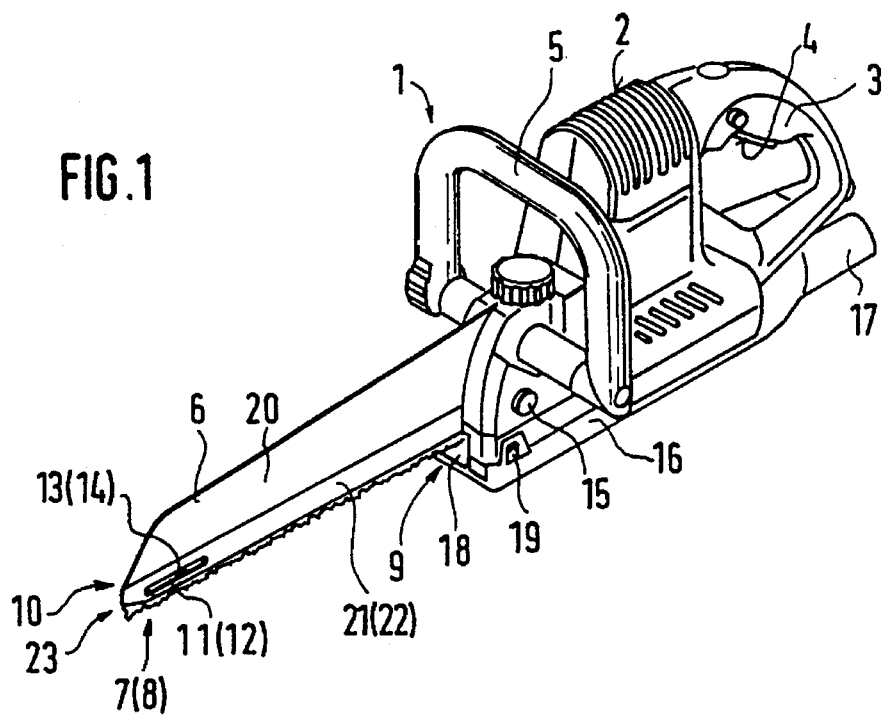
FIG. 1 is a perspective view of a sword saw in accordance with one embodiment of the present invention.

A sword saw shown in a side view in FIG. 1 is identified as a whole with reference numeral 1. It has a machine housing 2 with an operating handle 3, an on-off switch 4, an arcuate auxiliary handle 5 and a sword 6 connected with the machine housing 2. Two reciprocating blades 7 and 8 are guided in the sword 6 and extend through a throughgoing opening 9 in the machine housing 2.

In FIG. 1 the right saw blade 8 is partially covered by the left saw blade 7, and only the left side of the sword saw 1 is visible. For a better understanding the reference numerals of those elements which are not visible are used in brackets in the drawings. The same is used for reference numerals of not visible second parts of the remaining Figures.

Figure 3:
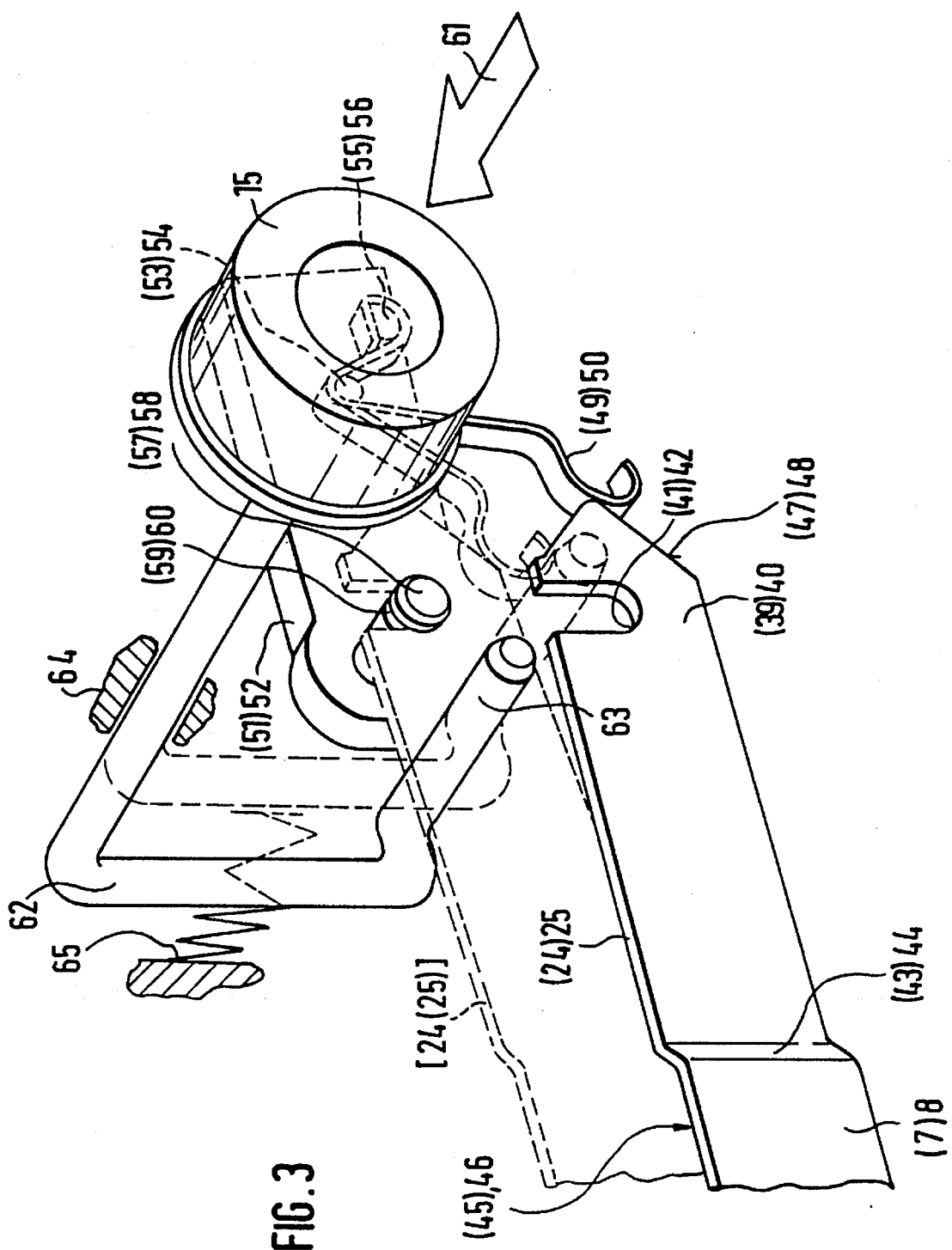
FIG. 3 is a perspective view of holding means and a clamping end of a saw blade in two phases during clamping.

Longitudinal slots 11 and 12 are arranged at a sword tip 10 at both sides of the sword 6 near the saw blades 7, 8. Projections 13, 14 of the saw blades 7, 8 are formed as sliding blocks and non-releasably guided in the longitudinal slots. A push button 15 is arranged laterally in the machine housing 2 for releasing the saw blades 7, 8 from a clamping means which are illustrated in FIG. 3. A suction unit 16 with a suction pipe 17 and a suction nozzle 18 is mounted by holding springs 19 releasably on the machine housing 2. The sword 6 has a central metal plate 20 which carries side metal plates 20 and 21 forming a guiding groove 23 therebetween.

Figure 2:
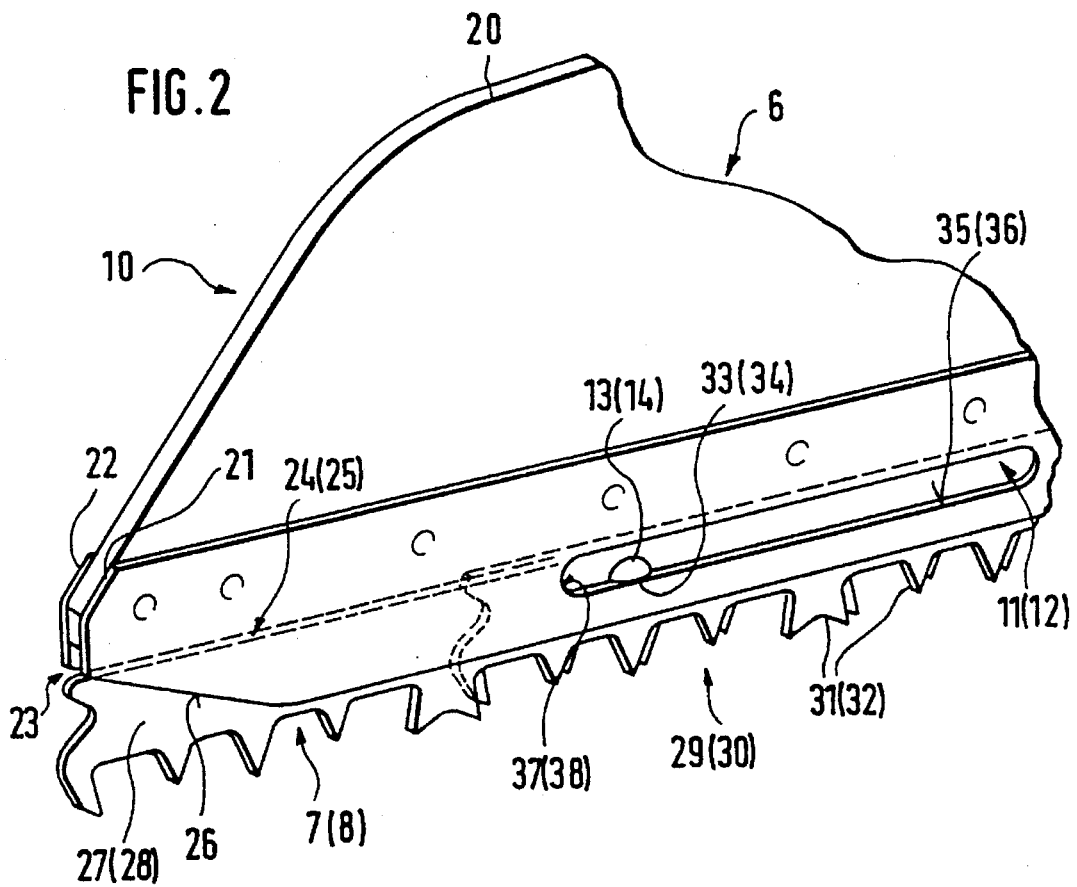
FIG. 2 is an enlarged view of a sword tip of the sword saw of FIG. 1.

As can be seen from the enlarged view of the sword tip 10 in FIG. 2, the central plate 20 in its region facing the blades 7, 8 carries at both sides the side plates 21 and 22 which form the guiding groove 23 for the saw blades 7, 8. Saw blade backs 24, 25 are supported during sawing against a bottom of the guiding groove 23. The saw blade backs 24, 25 are hardened to provide a high service life of the saw blades. The side plates 21, 22 are provided in the region of the sword tip 10 with a plunging-in incline 26. Thereby the saw blade tips 27, 28 are released to a certain degree and can be favorably controllably positioned relative to a not shown workpiece. The saw blades 7, 8 carry saw teeth 31, 32 at tooth sides 29, 30.

The lower, straight edges 33, 34 of the projections 13, 14 slide on the lower edges 35, 36 of the longitudinal slots 11, 12 and prevent falling out or withdrawal of the saw blades 7, 8 downwardly from the sword 6.

The coupling means for the saw blades 7, 8 shown on an enlarged scale in FIG. 3 are illustrated in two phases during the clamping only for the right saw blade 8 of FIGS. 1, 2. In the first phase, at the beginning of the insertion of the saw blade 8 the saw blade and the associated parts to be moved to the coupling position are identified with solid lines. In the second phase, or in other words in the coupling position, the saw blade 8 and the movable parts are identified with broken lines.

At the clamping end 39, 40 of the saw blades 7, 8 which is opposite to the saw blade tips 27, 28, the contour of the saw blade backs 24, 25 is interrupted by a U-shaped arresting opening 41, 42. The clamping end 39, 40 is bent by a bend 43, 44 toward an outer flat side 45, 46. Thereby the clamping ends 39, 40 are guided in the sword saw 1 with a distance from one another, and cannot contact one another. A guiding spring 49, 50 is associated with the insertion incline 47, 48 facing away from the saw blade backs 24, 25 at the clamping ends 39, 40. The guiding spring is arranged in the insertion direction of the saw blade 7, 8 turnably on a base body 51, 52 which is arranged on a transmission part of the sword saw 1 for reciprocating driving. The guiding spring 49, 50 is turnably supported with its lower flat side on a pin 53, 54. The guiding spring 49, 50 is mounted with its ear-shaped bent end on a further holding pin 55, 56 of the base body 51, 52 shown in FIG. 7. The base body 51, 52 carries an arresting pin 57, 58 perpendicular to the outer flat side 45, 46 of the saw blade 7, 8. The outer diameter of the arresting pin 57, 58 is greater than the width of the arresting opening 41, 42.

The arresting pin 57, 58 carries near its free end a circumferential annular groove 59, 60 which is somewhat wider than the thickness of the clamping end. Thereby the contour of the arresting opening 41, 42 can engage in the annular groove 59, 60, so that the clamping end 39, 40 is secured in its position transversely to the displacement direction or parallel to the axis of the arresting pin 57, 58.

The push button 15 is shown only in a releasing position. It is connected with a holding bracket 62 and a holding rod 63 and illustrated in the position during insertion of the clamping end 39, 40 displaced to the left (in solid lines).

Figure 7:
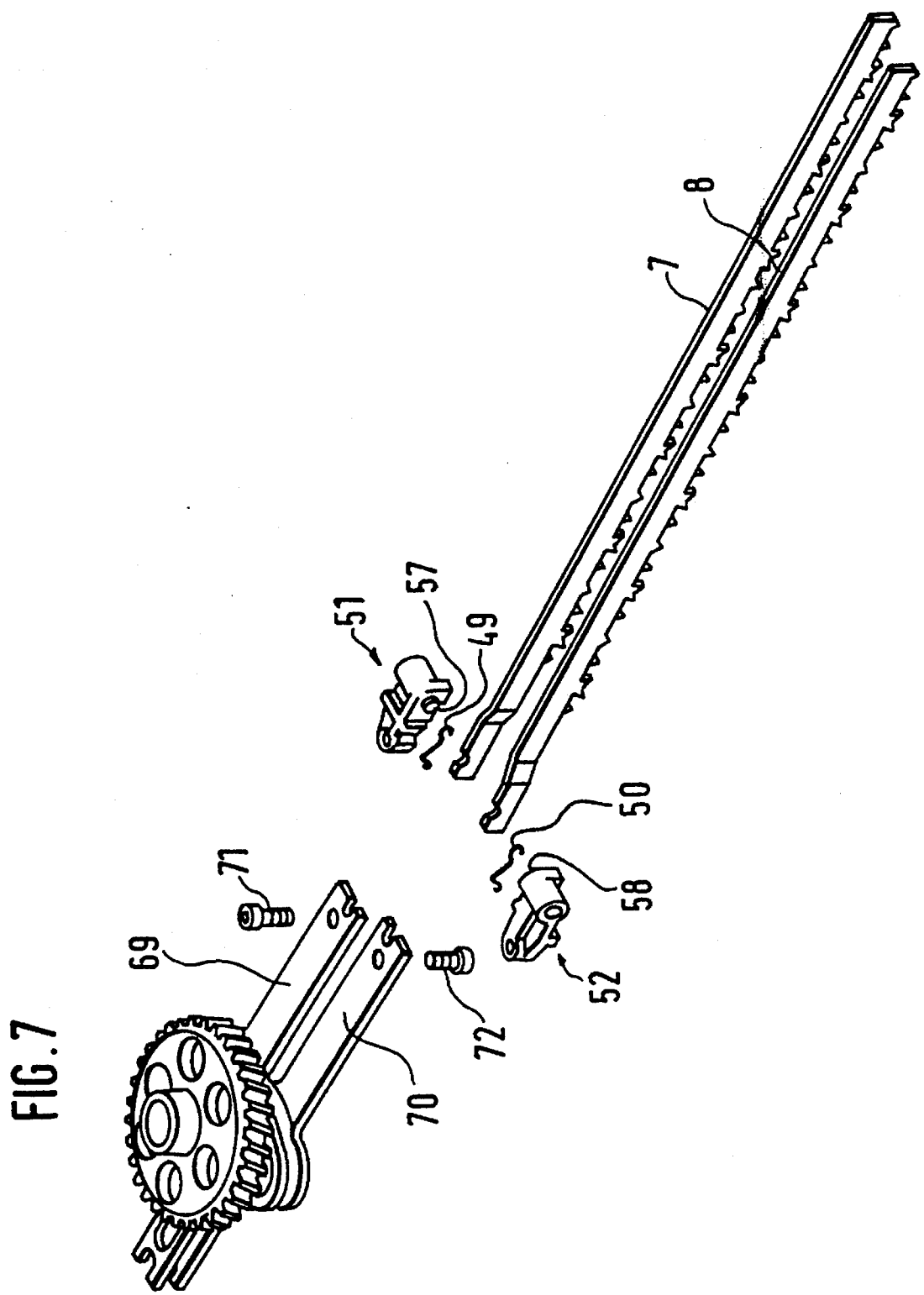
FIG. 7 is an exploded view of a saw blade pair with base bodies and transmission parts.

In the blocking position in which the holding rod 63 engaged with the saw blade 7, 8, the holding rod and the holding bracket 62 are illustrated as displaced to the right (in broken lines). Guiding means 64 operating for displacing the holding bracket 62 in the machine housing 2 and a return spring 65 abutting against the holding bracket 62 are shown schematically. The operating arrangement of the saw blade pair 7, 8, or in other words also the saw blade 7 which is not shown in FIG. 3 relative to the saw blade 8 is shown in FIG. 7.

The sword saw 1 in accordance with the present invention operates in the following manner:

By actuating the switch 4 the not shown motor is activated and reciprocatingly moves the saw blades 7, 8 along the sword 6. The saw blades 7, 8 are supported with their flat sides against one another and simultaneously are supported with their saw blade backs 24, 25 on the bottom of the guiding groove 23 in the sword 6. By engaging the projection 13, 14 at both sides in the longitudinal slots 11, 12 an especially stable guidance of the saw blades 7, 8 in particular in the region of the sword tip 9 is provided. If the blades 7, 8 are clamped in a cutting gap, then during withdrawal of the sword saw 1 from the cutting gap against the clamping force, the saw blade 7, 8 are reliably held in the sword 6.

The saw blades 7, 8 are clamped on the clamping means of the sword saw 1 in the following manner:

First the clamping end 39, 40 is inserted in the through-going opening 10 of the machine housing 2 along the lower edge of the sword 6. The clamping end 39, 40 abuts with its insertion incline 47, 48 on the flat spring-like guiding spring 49, 50. The insertion incline 47, 48 slides inclinedly upwardly on it, or the forwardly curved region and can no longer fall out downwardly. During further displacement of the clamping end 39, 40 or the saw blade 7, 8 rearwardly the guiding spring 49, 50 is turned rearwardly and finally, presses with increasing return force the clamping end 39, 40 upwardly so that the arresting opening 41, 42 extends in the annular groove 59, 60 of the arresting pin 57, 58.

During insertion of the saw blade 7, 8 or the clamping end 39, 40, the push button 15 is displaced in direction of the operating arrow 61, so that the holding rod 63 is pressed out from the plane of the saw blade clamping end 39, 40 and cannot hinder it during the insertion.

When the arresting opening 41, 42 is positioned on the arresting pin 57, 58, the guiding spring 49, 50 abuts against the clamping end 39, 40 and holds it in a gap-free manner elastically on the base body 51, 52 or on the arresting pin 57, 58, so that a contact between the saw blade 7, 8 and the holding rod 63 is excluded. Now the push button 15 can be released, so that the holding bracket 62 together with the holding rod 63 can follow the return spring 65 and can slide back in the housing 2 in the guiding means 64 to a position in which the holding rod 63 is arranged adjacent to the saw blade 7, 8 contactlessly with the saw blade 7, 8.

After mounting of the clamping end 39, 40 on the clamping means, the saw blade tip 27, 28 can displace in the guiding groove 23 with compression of the flat sides with the saw blade backs 24, 25 and engage with the projection 13, 14 in the longitudinal slot 11, 12 in a wedge-like manner. The saw blades 7, 8 are turned around the arresting pins 57, 58 to the sword 6 and therefore are mounted in the guiding groove 23 to be ready for operation.

The opposite lateral support of the saw blade tips 27, 28 in the guiding groove 23 shown in FIG. 2 prevents an undesired release of the projection 13, 14 from the longitudinal slot 11, 12. This support must be provided over the whole stroke length of the saw blades 7, 8 in the region of the longitudinal slots 11, 12, so as to prevent lateral or transverse bending of the saw blade tips 27, 28 and therefore prevent an undesired withdrawal of the projections 13, 14 from the longitudinal slots 11, 12.

The saw blades 7, 8 are dismounted in the following manner:

The bush button 15 is displaced against the return spring 65 so that the holding rod 63 is moved back from the saw blade plane. The saw blades 7, 8 are moved away from the sword for example with work gloves by hand in the region of the clamping ends 39, 40. Thereby the arresting openings 41, 42 can move against the supporting force of the guiding springs 49, 50 from the annular grooves 59, 60 of the arresting pins 57, 58. The saw blade tips 27, 28 remain suspended with the projections 13, 14 in the longitudinal slots 11, 12 similarly to a hinge. They can be withdrawn in a longitudinal direction forwardly first for one saw blade and then for another saw blade, from the guiding groove 23. The projections 13, 14 can move out from the longitudinal slots 11, 12 at their front ends 37, 38, and the side plates 21, 22 are insignificantly elastically transversely deformed.

Figure 4:
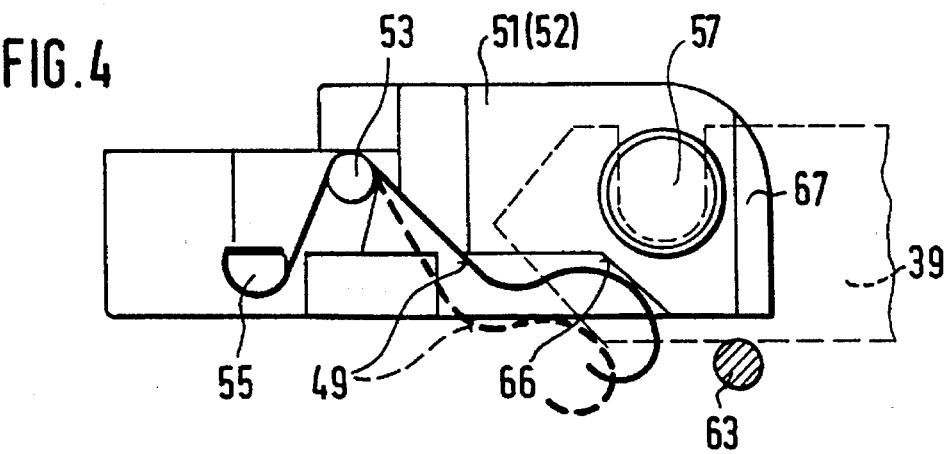
FIG. 4 is a side view of the holding means with the clamping end of the inventive sword saw.

The left base body 51 with the clamping end 39 of the saw blade 7 is shown on the side view in FIG. 4. The guiding spring 49, the pin 53, the holding pin 55, the arresting pin 57 and the holding rod 63 in a cross-section are illustrated in this Figure. Moreover, it can be seen that the guiding spring 49 abuts against an abutment surface 66 of the base body 51 and therefore determines the smallest distance of the guiding spring 49 from the arresting pin 57. The guiding spring 49 shown in broken lines is in its supporting position, in which it holds the clamping end 39 relative to the arresting pin 57.

Figure 5:
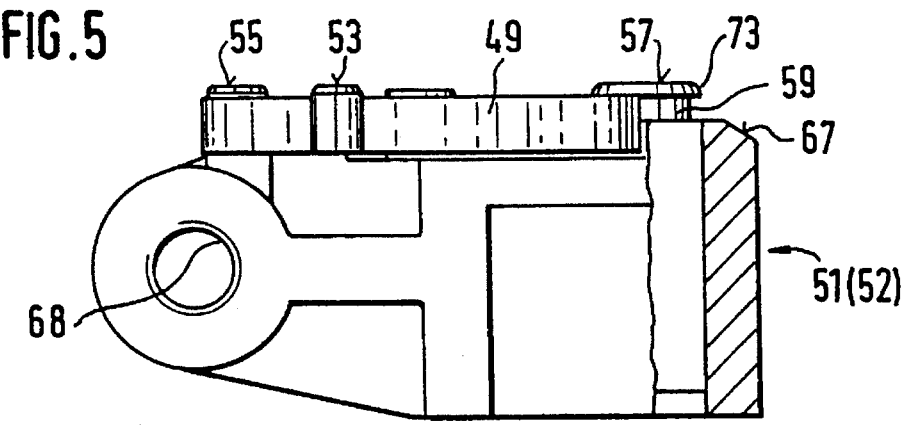
FIG. 5 is a view from below of an individual base body of FIG. 4.

FIG. 5 shows the base body 51 from below. The arresting pin 57, the circumferential annular groove 59, the guiding spring 49, the pin 53 and the holding pin 55 can be seen in this drawing. Moreover, this Figure shows an insertion chamfer 67 which facilitates the positioning of the clamping end 39 relative to the arresting pin 57. An opening 68 at the side of the base body 51 which is opposite to the insertion chamfer 67 serves for mounting the base body 51 on a connecting rod-like, reciprocating transmission part 69 of the sword saw 1 shown in FIG. 7. The arresting pin 57, 58 is pressed in the base body 51, 52 so that the inner side of the groove is closed with the base body 51, 52 to be flush. The guiding spring 49, 50 is mounted on the base body 51, 52 with prestress and thereby secured against loosening.

Figure 6:
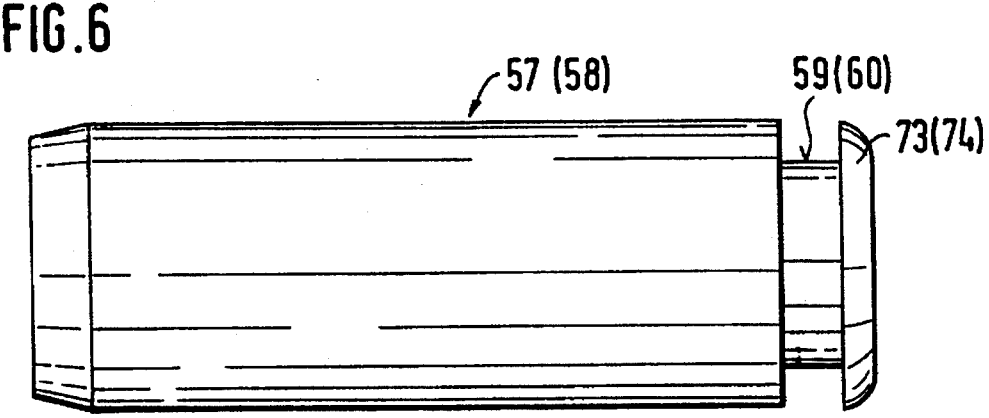
FIG. 6 is a view showing a single arresting pin for holding the clamping end.

The arresting pin 57, 58 is shown as a unit in FIG. 6 with the annular groove 59, 60 and rounded contours of one end or the correct size ratios of the diameter to the width and depth of the annular groove, height of the pin head 73, 74.

The exploded showing of FIG. 7 illustrates the position of the saw blade 7, 8, the base body 51, 52 with the arresting pin 57, 58, the guiding spring 49, 50, as well as the transmission part 69, 70 relative to one another and the connection of the base body 51, 52 relative to the transmission part 69, 70 by means of mounting screws 70, 71.

The free ends of the arresting pins 57, 58 during starting of the operation of the saw are reciprocatingly movable closely adjacent to one another or facing one another. For providing easy sliding of the arresting pins 57, 58 during the reciprocating movement in the case of possible extreme loads in contact, the edges on their heads 73, 74 are rounded.

The base body 51, 52 is composed preferably of aluminum. The arresting pins 57, 58, the pins 53, 54 and the holding pins 55, 56 are preferably composed at least partially of hardened steel.

The clamping ends 39, 40 and the dimensions of the insertion inclines 47, 48 and the arresting openings 41, 42 are identical for the left and right saw blades 7, 8 the geometry of the bends 43, 44 is mirror-symmetrical. The edges of the arresting openings 41, 42 are hardened. The base body 51, 52 is fixable by a not shown centering projection relative to the transmission part 69, 70.

It will be understood that each of the elements described above, or two or more together, may also find a useful application in other types of constructions differing from the types described above.

While the invention has been illustrated and described as embodied in a power-operates word saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A power operated sword saw, comprising a plate-shaped sword having a lower region with a guiding groove; two saw blades reciprocatingly movable in opposite directions parallel to one another and each having a front saw blade tip and an opposite clamping end, each of said saw blades having a toothed side provided with a plurality of teeth and an opposite saw blade back guided in said guiding groove of said sword; clamping means; a drive which is coupled with said clamping ends of said saw blades through said clamping means; means for jointly coupling said saw blades with said clamping means and releasing said saw blades from said clamping means without auxiliary tools; and blocking means which are located adjacent to said clamping ends contactlessly with said clamping ends during normal operation and prevent a complete release of said clamping ends in a coupling position and which also are movable into another position out of the blocking position to give way for mounting of said saw blades and dismounting; and a housing, said blocking means being fixed with said housing.

2. A power-operated sword saw as defined in claim 1, wherein said clamping ends of said saw blades are arrestably engaged in said clamping means.

3. A power operated sword saw, comprising a plate-shaped sword having a lower region with a guiding groove; two saw blades reciprocatingly movable in opposite directions parallel to one another and each having a front saw blade tip and an opposite clamping end, each of said saw blades having a toothed side provided with a plurality of teeth and an opposite saw blade back guided in said guiding groove of said sword; clamping means; a drive which is coupled with said clamping ends of said saw blades through said clamping means; means for jointly coupling said saw blades with said clamping means and releasing said saw blades from said clamping means without auxiliary tools; and blocking means which block said clamping ends so as to prevent release of said clamping ends in a coupling position and which also are movable into another position out of the blocking position to give way for mounting of said saw blades and dismounting, said blocking means including a holding rod; and a push button which moves said holding rod from the blocking position to a releasing position and vice versa.

4. A power-operated sword saw as defined in claim 3, wherein said blocking means includes only one said holding rod, said push button being only one push button which moves said only one holding rod.

5. A power-operated sword saw as defined in claim 3, wherein said clamping ends of said saw blades are provided with arresting openings, said clamping means being formed as arresting pins provided at a side of said drive and engaging with said arresting openings.

6. A power-operated sword saw as defined in claim 5, wherein said arresting openings are formed as U-shaped recesses on said saw blade backs at said clamping ends and engage said arresting pins in a hook-shaped manner.

7. A power-operated sword saw as defined in claim 5, wherein each of said arresting pins has a free end provided with an annular groove which forms a collar-shaped, rounded arresting pin head.

8. A power-operated sword saw as defined in claim 7, wherein in said coupling position of said saw blade relative to said arresting pins a contour of said arresting openings engages into said annular grooves so as to ensure that said clamping ends are not displaceable relative to said arresting pins in an axial direction perpendicular to flat sides of said saw blades.

9. A power-operated sword saw as defined in claim 7, wherein said arresting pins in the region of said arresting grooves and said arresting openings are identically hardened.

10. A power-operated sword saw as defined in claim 7, wherein said arresting pins in the region of said arresting grooves are harder than said arresting openings.

11. A power-operated sword saw as defined in claim 5, wherein said holding rod engages with said clamping ends at a side opposite to said arresting openings in a blocking position.

12. A power-operated sword saw as defined in claim 11, wherein said holding rod is a part of a holding bracket which engages said saw blades and is movable perpendicular to flat sides of said saw blade from a position blocking said clamping ends.

13. A power-operated sword saw as defined in claim 5; and further comprising base bodies arranged at a side of said drive and carrying said arresting pins; and guiding surfaces for guiding said clamping ends in said coupling position of said arresting openings on said arresting pins.

14. A power-operated sword saw as defined in claim 13; and further comprising guiding springs having flat sides which form said guiding surfaces.

15. A power-operated sword saw as defined in claim 14, wherein said guiding springs in said coupling position are supported on said clamping ends and fix said clamping ends with said arresting openings on said arresting pins.

16. A power-operated sword saw as defined in claim 5, wherein said clamping ends in said coupling position are rotatable relative to said arresting pins.

17. A power operated sword saw, comprising a plate-shaped sword having a lower region with a guiding groove; two saw blades reciprocatingly movable in opposite directions parallel to one another and each having a front saw blade tip and an opposite clamping end, each of said saw blades having a toothed side provided with a plurality of teeth and an opposite saw blade back guided in said guiding groove of said sword; clamping means; a drive which is coupled with said clamping ends of said saw blades through said clamping means; and means for jointly coupling said saw blades with said clamping means and releasing said saw blades from said clamping means without auxiliary tools; and blocking means which block said clamping end so as to prevent release of said clamping ends in a coupling position and which also are movable into another position out of the blocking position to give way for mounting of said saw blades and dismounting, each of said saw blades having a tip, said clamping end of each of said saw blades narrowing toward said tip and being provided with at least one insertion incline for inserting in said clamping means.

18. A power operated sword saw, comprising a plate-shaped sword having a lower region with a guiding groove; two saw blades reciprocatingly movable in opposite directions parallel to one another and each having a front saw blade tip and an opposite clamping end, each of said saw blades having a toothed side provided with a plurality of teeth and an opposite saw blade back guided in said guiding groove of said sword; clamping means; a drive which is coupled with said clamping ends of said saw blades through said clamping means; and means for jointly coupling said saw blades with said clamping means and releasing said saw blades from said clamping means without auxiliary tools; and blocking means which are located adjacent to said clamping ends contactlessly during normal operation and prevent a complete release of said clamping ends in a coupling position and which also are movable into another position out of the blocking position to give way for mounting of said saw blades and dismounting, said saw blade backs of said saw blades being at least partially hardened.

19. A power operated sword saw, comprising a plate-shaped sword having a lower region with a guiding groove; two saw blades reciprocatingly movable in opposite directions parallel to one another and each having a front saw blade tip and an opposite clamping end, each of said saw blades having a toothed side provided with a plurality of teeth and an opposite saw blade back guided in said guiding groove of said sword; clamping means; a drive which is coupled with said clamping ends of said saw blades through said clamping means; means for jointly coupling said saw blades with said clamping means and releasing said saw blades from said clamping means without auxiliary tools; and a blocking rod which is located adjacent to said clamping ends contactlessly with said clamping ends during normal operation and prevent a complete release of said clamping ends in a coupling position and which is movable into another position out of the blocking position to give way for mounting of said saw blades and dismounting; and a housing, said blocking rod being fixed with said housing.

20. A power operated sword saw, comprising a plate-shaped sword having a lower region with a guiding groove; two saw blades reciprocatingly movable in opposite directions parallel to one another and each having a front saw blade tip and an opposite clamping end, each of said saw blades having a toothed side provided with a plurality of teeth and an opposite saw blade back guided in said guiding groove of said sword; clamping means; a drive which is coupled with said clamping ends of said saw blades through said clamping means; means for jointly coupling said saw blades with said clamping means and releasing said saw blades from said clamping means without auxiliary tools; and blocking means which is located adjacent to said clamping ends contactlessly with said clamping ends during normal operation and resiliently block said clamping ends to prevent a complete release of said clamping ends in a coupling position and which also are movable into another position out of the blocking position to give way for mounting of said saw blades and dismounting; and a housing, said blocking means being fixed with said housing.

21. A power operated sword saw, comprising a plate-shaped sword having a lower region with a guiding groove; two saw blades reciprocatingly movable in opposite directions parallel to one another and each having a front saw blade tip and an opposite clamping end, each of said saw blades having a toothed side provided with a plurality of teeth and an opposite saw blade back guided in said guiding groove of said sword; clamping means; a drive which is coupled with said clamping ends of said saw blades through said clamping means; means for jointly coupling said saw blades with said clamping means and releasing said saw blades from said clamping means without auxiliary tools; and a blocking rod which is located adjacent to said clamping ends contactlessly with said clamping ends during normal operation and resiliently block said clamping ends to prevent a complete release of said clamping ends in a coupling position and which also are movable into another position out of the blocking position to give way for mounting of said saw blades and dismounting; and a housing, said blocking rod being fixed with said housing.

\* \* \* \* \*